(12) United States Patent
Diehl et al.

(10) Patent No.: US 8,561,129 B2
(45) Date of Patent: Oct. 15, 2013

(54) UNIFIED NETWORK THREAT MANAGEMENT WITH RULE CLASSIFICATION

(75) Inventors: David Diehl, Minneapolis, MN (US); Ramnath Venugopalan, Webster, NY (US); Stevan Markovic, Boynton Beach, FL (US); Michael W. Green, Shoreview, MN (US)

(73) Assignee: McAfee, Inc, Santa Clara, CA (US)

( * ) Notice: Subject to any disclaimer, the term of this patent is extended or adjusted under 35 U.S.C. 154(b) by 706 days.

(21) Appl. No.: 12/039,490

(22) Filed: Feb. 28, 2008

(65) Prior Publication Data

US 2009/0222877 A1 Sep. 3, 2009

(51) Int. Cl.
*G06F 17/00* (2006.01)
*H04L 29/06* (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | | |
|---|---|---|---|
| 2003/0188001 A1* | 10/2003 | Eisenberg et al. | 709/229 |
| 2005/0018618 A1 | 1/2005 | Mualem et al. | |
| 2005/0193429 A1* | 9/2005 | Demopoulos et al. | 726/23 |

FOREIGN PATENT DOCUMENTS

| | | |
|---|---|---|
| WO | WO-2006080930 A1 | 8/2006 |
| WO | WO-2009108303 A1 | 9/2009 |

OTHER PUBLICATIONS

*SonicWALL Intrusion Prevention Service 2.0: Administrator's Guide*, [online] SonicWALL, Inc., Retrieved from the Internet: <URL: http://www.sonicwall.com/downloads/SonicWALL_IPS_20_AdminGuide.pdf>, (Dec. 16, 2006), 38 pgs.

*eSoft Intrusion Prevention Training Guide, Version 1.0*, [online] eSoft, Inc., Oct. 1, 2006 [retrieved on Jun. 23, 2009] Retrieved from the Internet: <URL:http://www.esoft.com/support_docs/Intrusion_Preventi_on_Softpak. pdf>, (Oct. 1, 2006), 7 pgs.

International Application Serial No. PCT/US2009/001168, Search Report mailed Jul. 10, 2009, 7 pgs.

International Application Serial No. PCT/US2009/001168, Written Opinion mailed Jul. 10, 2009, 9 pgs.

European Application Serial No. 09715533.7, Amended Claims Response Filed Nov. 26, 2010, 18 pgs.

International Application Serial No. PCT/US2009/001168, International Preliminary Report on Patentability mailed May 18, 2010, 12 pgs.

International Application Serial No. PCT/US2009/001168, Response to Written Opinion and Amendment under Article 34 mailed Oct. 29, 2009, 6 pgs.

* cited by examiner

*Primary Examiner* — Kambiz Zand
*Assistant Examiner* — Stephen Sanders
(74) *Attorney, Agent, or Firm* — Wong, Cabello, Lutsch, Rutherford & Brucculeri, LLP (57) ABSTRACT

A computer network device comprises an intrusion prevention rule set comprising a plurality of rules, each of the plurality of rules associated with two or more rule classification parameters, and an intrusion prevention module that is operable to use two or more of the classification parameters associated with the plurality of intrusion protection rules to selectively apply the rules to provide network intrusion protection of network traffic.

20 Claims, 5 Drawing Sheets

| FIREWALL | | | |
|---|---|---|---|
| FROM IP | TO IP | PORT | RULE |
| A | B | 80 | ALLOW |
| C | B | 80 | ALLOW |
| * | B | 80 | DENY |

202 ⬈

| IPS | |
|---|---|
| ID | RULE |
| 80 | ALLOW (HTTP PORT) |
| "4XH//" | DENY (HTTP ATTACK) |
| "XYZZY" | DENY (FTP ATTACK) |

UNIFIED NETWORK THREAT MANAGEMENT WITH RULE CLASSIFICATION

FIELD OF THE INVENTION

The invention relates generally to managing threats on a network, and more specifically to unified management of various network threats.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, computer users within an organization such as a corporation may on occasion attempt to perform unauthorized network communications, such as running file sharing programs or transmitting corporate secrets from within the corporation's network to the Internet.

For these and other reasons, many corporations, institutions, and even home users use a network firewall between their local network and the Internet. The firewall is typically a computerized network device that inspects network traffic that passes through it, permitting passage of desired network traffic based on a set of rules.

Firewalls perform their filtering functions by observing communication packets, such as TCP/IP or other network protocol packets, and examining characteristics such as the source and destination network addresses, what ports are being used, and the state or history of the connection. Some firewalls also examine packets traveling to or from a particular application, or act as a proxy device by processing and forwarding selected network requests between a protected user and external networked computers.

Connections between computers are often described in terms of ports, sockets, and other network-specific terms. In computer networks, a port is typically a specific number included in a packet of network data that identifies the packet to a particular process or program running on the computer. Many numbers have become standard, such as use of port 80 for HTTP web browsing, use of port 25 to send mail to an SMTP server and use of port 110 to retrieve mail from a POP server, and use of port 443 for secure HTTP web connections.

Processes manage connections to various ports through sockets, which comprise source and destination communications endpoints identified by port and network address, along with protocol identification. In one example, a program might use a socket provided via the operating system with a local address of 10.1.1.1:9876, and a remote address of 192.168.1.1:80.

Managing the traffic flow between computers typically involves monitoring connections between various ports, sockets, and protocols, such as by examining the network traffic in a firewall. Rules based on port, IP, or socket numbers are used to selectively filter or pass data, and to log network activity.

SUMMARY

Some example embodiments of the invention comprise a computer network device that comprises an intrusion prevention rule set comprising a plurality of rules, each of the plurality of rules associated with two or more rule classification parameters, and an intrusion prevention module that is operable to use two or more of the classification parameters associated with the plurality of intrusion protection rules to selectively apply the rules to provide network intrusion protection of network traffic. In further examples, the rules comprise signatures, policies, responses, and other such information.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Some example embodiments of the invention comprise a computer network device that comprises an intrusion prevention rule set comprising a plurality of rules, each of the plurality of rules associated with two or more rule classification parameters, and an intrusion prevention module that is operable to use two or more of the classification parameters associated with the plurality of intrusion protection rules to selectively apply the rules to provide network intrusion protection of network traffic. Other examples include methods of operating a computer network device, abstraction of protection rules, and association of response types with protection rules.

Figure 1:
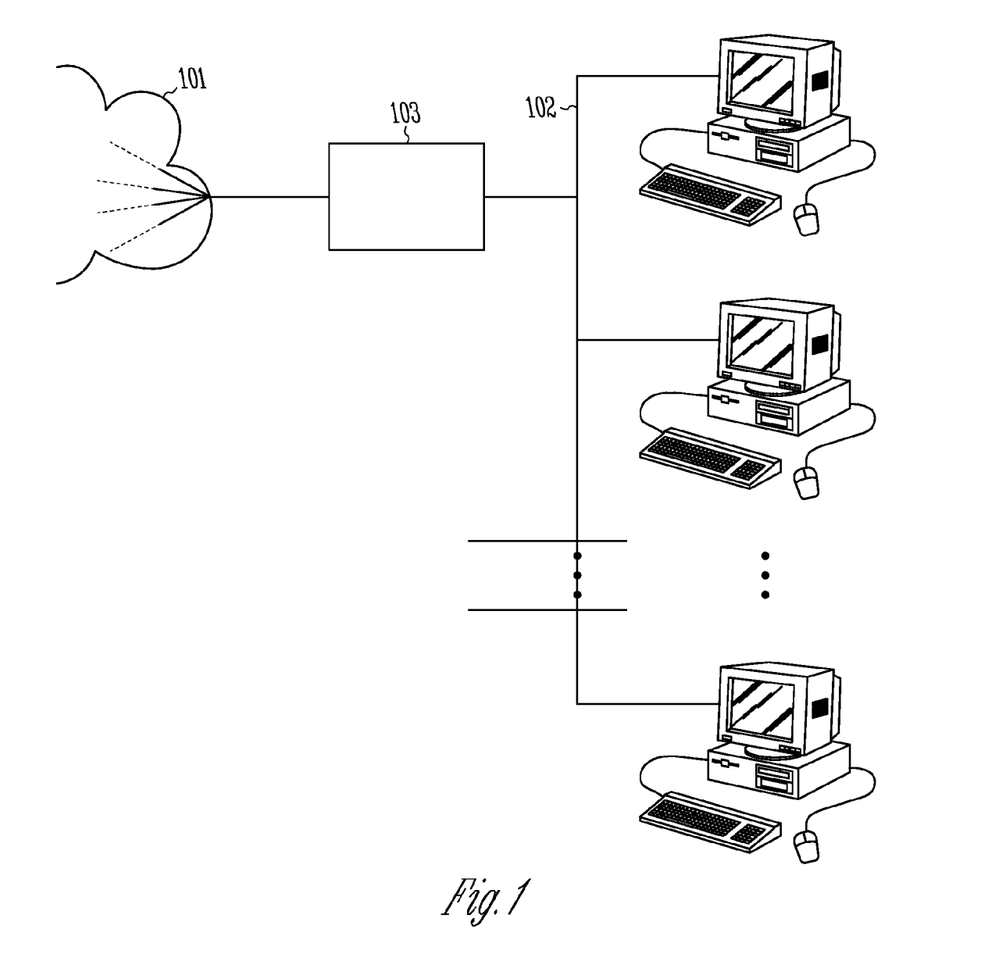
FIG. 1 shows a computer network with a firewall and intrusion protection device, as may be used to practice some example embodiments of the invention.

FIG. 1 illustrates a typical network environment, including a public network such as the Internet at 101, a private network 102, and a computer network device operable to provide firewall and intrusion protection shown at 103. In this particular example, the computer network device 103 is positioned between the Internet and the private network, and regulates the flow of traffic between the private network and the public network.

The network device 103 is in various embodiments a firewall device, and intrusion protection device, or functions as both. A firewall device or module within the network device provides various network flow control functions, such as inspecting network packets and dropping or rejecting network packets that meet a set of firewall filtering rules. As described previously, firewalls typically perform their filtering functions by observing communication packets, such as TCP/IP or other network protocol packets, and examining characteristics such as the source and destination network addresses, what ports are being used, and the state or history of the connection. Some firewalls also examine packets traveling to or from a particular application, or act as a proxy device by processing and forwarding selected network requests between a protected user and external networked computers.

Because many port numbers have become standard, such as use of port 80 for HTTP web browsing, use of port 25 to send mail to an SMTP server and use of port 110 to retrieve mail from a POP server, and use of port 443 for secure HTTP web connections, the firewall can use the port number along with the apparent protocol type to determine the nature of many network connections. Program processes manage connections to various ports through sockets, which comprise source and destination communications endpoints identified by port and network address, along with protocol identification. Some firewall examples will manage the flow of traffic for a particular application, identifying data packets by the associated socket.

Although a firewall can be used to manage the traffic flow between computers such as by monitoring connections between various ports, sockets, and protocols, they are less effective at blocking certain types of network threats. Firewall rules based on port, IP, or socket numbers are used to selectively filter or pass data, and to log network activity in a firewall, but do not provide intrusion prevention functionality.

An Intrusion Prevention System, or IPS, is designed to monitor network traffic such as by providing information on overly active hosts, bad logons, inappropriate content, and many other network and application layer functions. Some IPS systems also use various pattern matching technologies to detect various signatures or patterns in the network traffic that are known to be associated with undesired content. The undesired content, such as viruses, Trojan horses, keystroke loggers, and other unwanted data can thereby be searched and blocked on the network, preventing certain network traffic based on the content of the traffic rather than on the type of traffic.

But, in prior art systems the firewall and IPS are typically separate systems, and operate independent from one another even when incorporated into the same physical device or product. Various embodiments of the invention improve upon this by incorporating firewall and IPS protection into the same system, and rely upon interaction between the two to provide improved protection in further embodiments. See, for example, flowchart 600 of FIG. 6.

Figure 2:
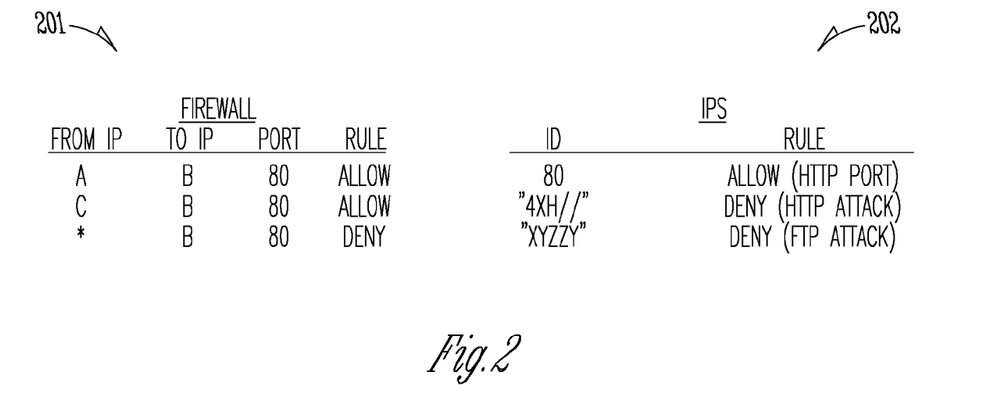
FIG. 2 illustrates example firewall and IPS rules, as may be used to practice some example embodiments of the invention.

FIG. 2 shows an example of typical firewall and IPS rules, consistent with the prior art. At 201, a set of firewall rules dictates how data received on port 80 is handled, as the rules are processed in order. First, if the data is from computer A going to computer B, it is allowed. Second, if the data is from computer C going to computer B it is allowed, Any other source IP other than those of computers A and C will fall under the third rule, which denies all other traffic from any computer to computer B on port 80. This short example of a rule set illustrates how a certain port on a certain computer can be opened for certain purposes, such as for a computer B on a protected network to receive HTTP traffic on port 80 from select computers A and B on the Internet.

At 202, a different rule set for an IPS system is illustrated, consistent with the prior art. The first rule is set to allow incoming traffic on port 80, anticipating that it is generally going to be permissible HTTP traffic. Other rules may limit certain traffic on port 80, but the general rule is to permit traffic. The second rule searches for the string "4×h//", which is recognized as part of a known HTTP attack. The third rule similarly looks for the string "xyzzy", which is part of a known FTP attack.

Using firewall and IPS rule sets such as these, separate firewall and IPS modules within a unified threat management system apply typically many thousands of rules to every packet of incoming data. But, the thousands of rules can be cumbersome to manage, and can take significant processor resources to apply to heavy network traffic. Also, an IPS signature applied to a network data stream can in some instances generate false positive alarms, distracting administrative resources from real threats.

Figure 6:
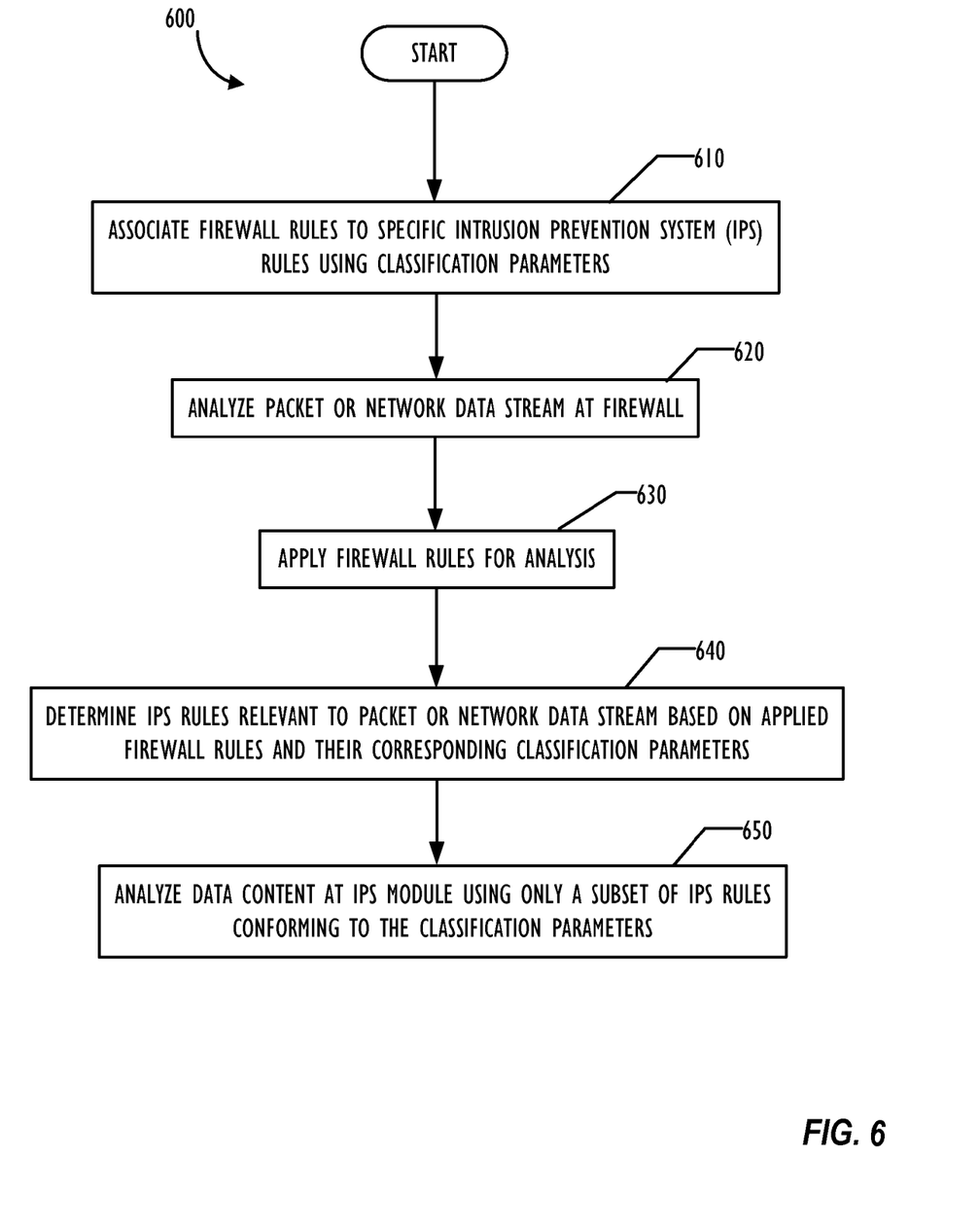
FIG. 6 is a flowchart illustrating an example method of selectively applying IPS rules based on classification parameters.

Referring now to FIG. 6, method 600 illustrates improvements over the above referenced prior art implementations. As in the prior art, a firewall can analyze a packet of data stream (620) and apply firewall rules for the analysis (630). However, disclosed embodiments further include associating firewall rules to specific IPS rules using classification parameters (610), determining IPS rules relevant to the packet or data stream based on applied firewall rules and their corresponding classification parameters (640) such that the data content is analyzed using only a subset of IPS rules that conform to the classification parameters (650).

For these and other reasons, some embodiments of the invention comprise tying firewall rules to specific IPS rules, such that only IPS rules already determined relevant to a particular packet or network data stream are applied to the network data. Rule set configuration complexity is addressed in some further embodiments by assigning classification parameters to the rules in an IPS rule set, such as categories identifying the relevant protocol or type of threat. New or updated rules are automatically applied in a more detailed example, using the classification parameters and configuration information based on the classification parameters.

Rule classification in this manner reduces the configuration burden on the manager of the IPS/firewall device, as the classification parameters associated with each rule provide a layer of abstraction that can be used to more easily configure large rule sets for a particular application. A corporation not providing FTP service may, for example, be configured to block all FTP requests in the firewall, and to ignore any FTP-specific rules in the IPS rule set, as all incoming FTP traffic will be blocked.

Classification parameters include in a further example a response map, used to dictate the actions taken as a result of a rule violation. In a more detailed example, a rule is associated with at least one category, such as HTTP server, telnet, etc; a policy type, such as detect (IDS) or prevent (IPS); and at least one attack type, such as probe, root exploit, virus, etc. These three properties of the rule are used to organize the rule set, where each rule typically includes a signature or rule used to determine whether or not the traffic in a given network data stream matches the rule.

The category and the policy type are used together to form a signature group, such as to detect but not prevent certain types of HTTP traffic based on whether the threat associated with the rule's signature carries a significant risk, whether there is high certainty of the signature being exclusive to the threat, and other factors. For example, a certain signature might identify network traffic that is simply probing IP addresses or that is only a suspected attack and likely to occasionally incorrectly identify an incoming attack, and so have a policy type of detect, or IDS (Intrusion Detection System rule).

The policy type is similarly used with the attack type to form a response map, such as to allow and audit certain FTP and telnet activity, but to drop probe activity with no audit. The response map can be used to configure certain threat types to be rejected, which includes notifying the sender that the network traffic was rejected; dropped, in which the network traffic is audited and discarded but the sender is not notified; audited, in which the traffic is allowed but logged; ignored; or dropped with no audit.

A packet or network stream having a detect/IDS policy type and a certain attack type can be configured to be handled in a certain way, as described above. Desirably, the response should be associated with the anticipated severity and type of the attack, but can be handled as the network administrator sees fit using the configuration options of the IPS system. Further, because rules are grouped in two different abstracted dimensions (signature group and response map), the complexity of system configuration is reduced without reducing the flexibility of the system to be configured to handle certain traffic types. A user of the system can use the signature group information and response map data to configure a network traffic protection device such as an IPS system or combined IPS/firewall device, rather than by examining each individual rule in the rule set and selecting whether to apply it. This layer of abstraction makes configuration of the network device significantly less time consuming and easier to understand, while allowing for the automatic application of updated or new rules based on their category group and response map data.

Figure 3:
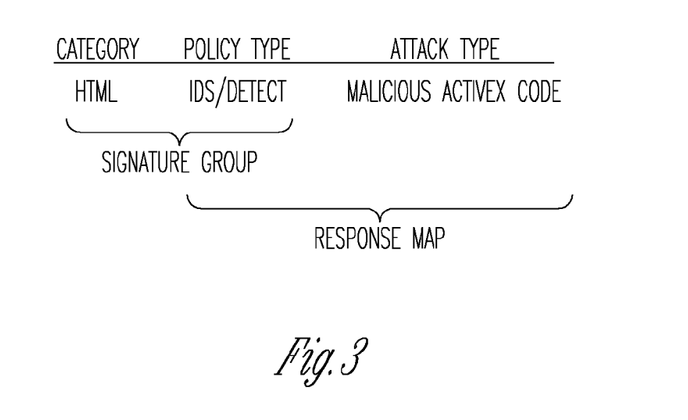
FIG. 3 shows a an example rule having various classification parameters, consistent with an example embodiment of the invention

For example, a new rule automatically downloaded from a subscription service or other rule provider is shown in FIG. 3, including the classification parameters described above. The category is HTML, the policy type is IDS or detect, and the attack type is malicious ActiveX code. The signature group is made up of the category and policy type, and comprises HTML data that is to be detected based on the risk of execution and the lack of certainty that the signature information will effectively block only the undesired threat and not cause false positives. The response map comprises the policy type information indicating that data matching the signature is to be dropped, and the attack type indicating that it is malicious Active X code.

If incoming network traffic matches the signature group, based on inspection of packets or stream information from the firewall, the new rule will automatically be applied to the incoming data stream. If such a response map has previously been configured to allow but audit network traffic associated with an IDS/malicious ActiveX response map, the new rule will be immediately applied such that it will also allow but audit network traffic matching this rule.

In a some embodiments, the IPS system therefore looks only at rules having a certain signature group based on the firewall rules or on other network data information from the firewall. For example, if all HTTP traffic from certain systems is to be allowed in the firewall rules, some or all types of HTTP traffic/threats as identified by the signature group may be ignored in the IPS module when the HTTP traffic is from the certain systems, saving processing time and speeding up network traffic. If some HTTP traffic is to be monitored anyway, such as HTTP traffic not from a certain set of source IP addresses, the classification data as shown in FIG. 3 can also be used to apply only those IPS rules having select policy types to the HTTP network traffic.

Figure 4:
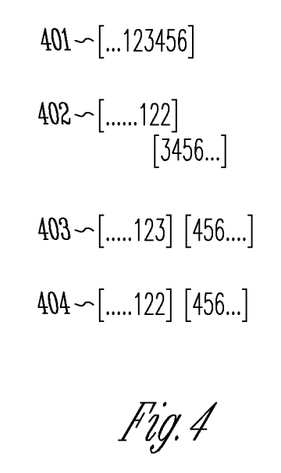
FIG. 4 shows network communication packets illustrating normalized packet retransmission, consistent with an example embodiment of the invention.

The incoming data is in some embodiments pre-formatted, such as by being read and rewritten using a consistent set of rules, as shown in FIG. 4. Here, a data stream is being searched for a relatively simple threat signature of the characters "123456" in order. A packet such as that shown at 401, for example, includes this signature string, and so would be flagged as violating a rule having the example signature. At 402, a more sophisticated example is shown, in which the signature spans multiple packets, and the second of two packets is indexed such that the first byte of the second packet overlaps with the last byte of the first packet. Because different network devices can handle such network traffic differently, there is some ambiguity in what the resulting data stream reconstructed from the packets will be.

This becomes problematic if, for example, the receiving computer and the IPS system use different rules or techniques in reconstructing the data stream. Consider an example in which the IPS system first receives the packets shown at 402, and retains the first-received byte in question to produce the data stream shown at 404. Even with the capability of looking for signatures that span multiple packets, the data stream "122456" is detected, and will not match the example signature. The packets are therefore forwarded as-is, and are received in a destination computer system that overwrites the byte in question with the last byte received, resulting in the data string shown at 403. This data string contains the signature in question, and therefore may include a virus or other threat not detected by the intrusion protection system.

Some embodiments of the invention therefore do not simply read and analyze the incoming packets, but read them and reformat them using a specific set of rules, such that the resulting data stream that is analyzed is identical to the data stream that is sent from the computer network protection system to the destination computer.

Figure 5:
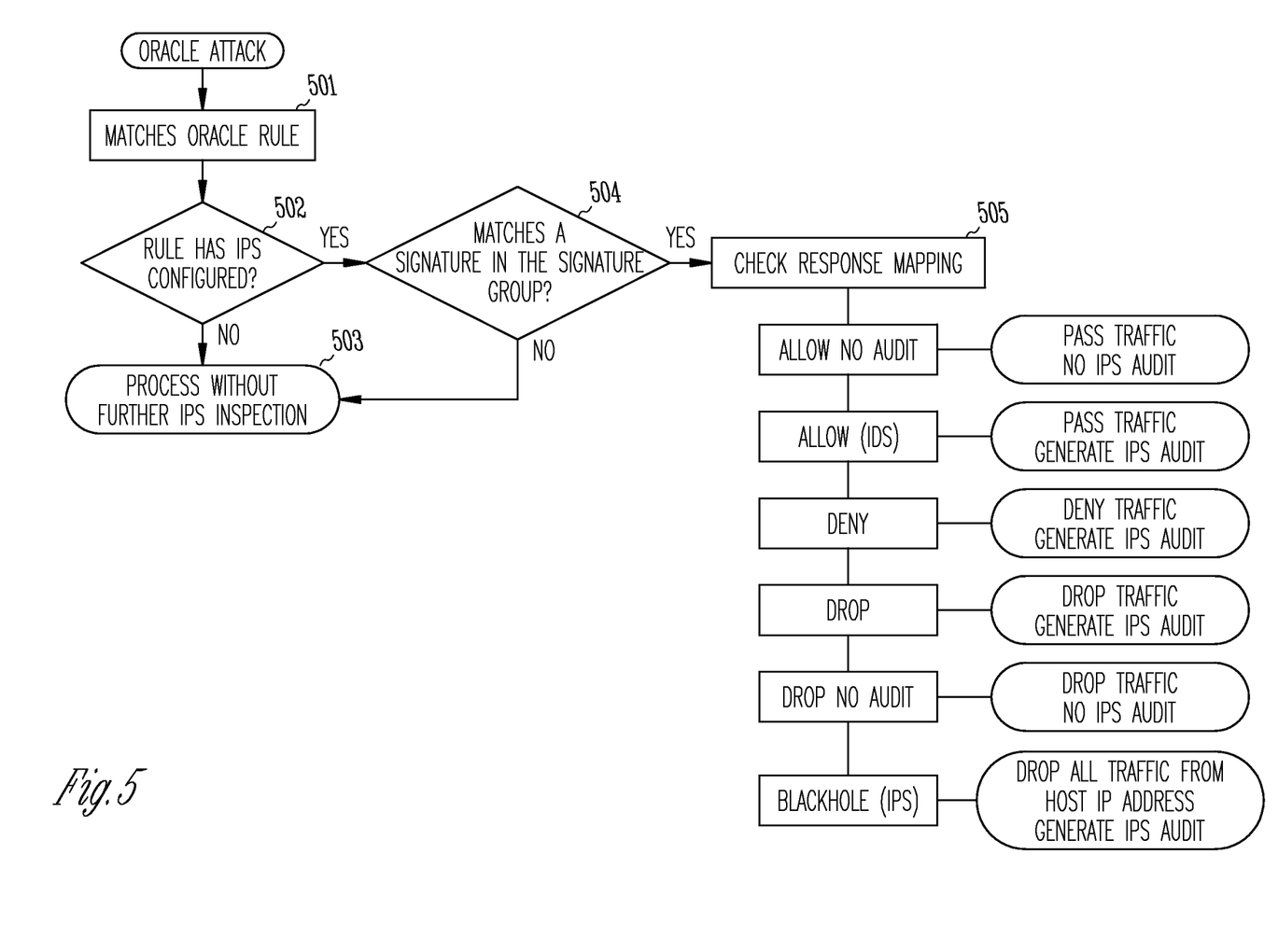
FIG. 5 is a flowchart illustrating an example method of applying rules to network data, consistent with an example embodiment of the invention.

IPS rules are applied in a further embodiment based on more complex classification parameters, or on classification parameters other than those discussed here. A more sophisticated application of an IPS rule set to a network packet or data stream is shown in the flowchart of FIG. 5, including application of Oracle-specific rules to a data stream.

Here, a rule set that describes Oracle™-specific attacks that target an Oracle database server have been configured with one signature group as an IDS rule that is set to Allow and for another signature group as an IPS rule that is set to black hole or drop all traffic from the originating IP address. At 501, an incoming Oracle attack is identified as Oracle traffic, and matched against the Oracle rule set. If the rule has no IPS configuration set, the packets are processed without further inspection in the IPS module at 503. If the rule has an IPS configuration at 502, the signature group is inspected at 504. If no matching signatures are found, the packets or data stream are again forwarded without further IPS inspection at 503, but if matching signatures are found, the response mapping is processed at 505.

The response mapping shown here comprises a series of possible actions that can be associated with the response map, including allowing the traffic with no audit, allowing the traffic but auditing or logging the traffic, denying the traffic and auditing it, dropping the traffic and auditing it, dropping the traffic with no auditing, and blackholing a traffic stream by blocking all traffic from the originating IP address for a period of time and auditing the event.

The examples presented here have shown how some embodiments of the invention provide improved network protection by tying firewall rules to specific IPS rules, such that only IPS rules already determined relevant to a particular packet or network data stream are applied to the network data. Rule set configuration complexity is addressed in some further embodiments by assigning classification parameters to the rules in an IPS rule set, such as categories identifying the relevant protocol or type of threat. New or updated rules are automatically applied in a further example, using the classification parameters and configuration information based on the classification parameters.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computer network device, comprising:
    an intrusion prevention rule set comprising a plurality of rules, each of the plurality of rules associated with two or more rule classification parameters; and
    an intrusion prevention module operable to use two or more of the classification parameters associated with the plurality of intrusion prevention rules to selectively apply the rules to provide network intrusion protection of network traffic,
    wherein selectively applying the rules comprises identifying a subset of the plurality of intrusion prevention rules applicable to a specific data stream by applying information from a firewall to the two or more rule classification parameters of the plurality of intrusion prevention rules, and processing only those intrusion prevention rules determined applicable to the specific data stream against the specific data stream, the information from the firewall obtained by the firewall when processing the specific data stream.

2. The computer network device of claim 1, wherein the rule classification parameters comprise at least one of a signature category, response type, and an attack type.

3. The computer network device of claim 2, wherein the signature category is used to limit rule processing to relevant signatures.

4. The computer network device of claim 2, wherein the response type determines an action taken for network traffic that violates an applicable rule.

5. The computer network device of claim 2, wherein the device is operable to automatically apply rule updates based on at least one of rule classification parameters and rule configuration parameters.

6. The computer network device of claim 1, further comprising a firewall module operable to use two or more firewall rules to provide firewall filtering of network traffic.

7. The computer network device of claim 6, wherein the intrusion prevention rules are associated with specific firewall rules, such that only relevant intrusion prevention rules are applied to specific network traffic identified via the firewall.

8. The computer network device of claim 1, further comprising a packet processing module operable to receive network packets and reconstruct a data stream from the data encoded in the received network packets.

9. A computer network device, comprising:
    an intrusion prevention rule set comprising a plurality of rules, each of the plurality of rules associated with at least one classification parameter, wherein the classification parameter comprises a rule type of the associated rule; and
    an intrusion prevention module operable obtain information from a firewall pertaining to specific network traffic and to use the classification parameters associated with the plurality of intrusion prevention rules to provide network intrusion protection of the specific network traffic;
    wherein providing network intrusion protection of the specific network traffic comprises selectively applying a subset of all available intrusion prevention rules based on the information from the firewall indicating rule classification parameters, the subset conforming to the indicated rule classification parameters the information from the firewall obtained by the firewall when processing the specific network traffic.

10. The computer network device of claim 9, wherein each of the plurality of rules of the intrusion prevention rule set is further a member of a rule group that is associated with a response type to be applied in the event of violation of a rule within the rule group.

11. A method of operating a computer network device, comprising:
    maintaining an intrusion prevention rule set comprising a plurality of rules, each of the plurality of rules associated with two or more rule classification parameters; and
    using two or more of the classification parameters associated with the plurality of intrusion prevention rules to selectively apply the rules via an intrusion prevention module of the computer network device to provide network intrusion protection of a specific portion of network traffic,
    wherein selectively applying the rules comprises identifying a subset of the plurality of intrusion prevention rules applicable to the specific portion of network traffic by applying data stream information from a firewall to the two or more rule classification parameters of the plurality of intrusion prevention rules, and processing only those intrusion prevention rules determined applicable to the specific portion of network traffic, the data stream information from the firewall obtained by the firewall when processing the specific portion of network traffic.

12. The method of operating a computer network device of claim 11, wherein the rule classification parameters comprise at least one of a signature category, response type, and an attack type.

13. The method of operating a computer network device of claim 12, wherein the signature category is used to limit rule processing to relevant signatures.

14. The method of operating a computer network device of claim 12, wherein an action taken for network traffic that violates an applicable rule is determined by the response type.

15. The method of operating a computer network device of claim 12, further comprising automatically applying rule updates based on at least one of rule classification parameters and rule configuration parameters.

16. The method of operating a computer network device of claim 11, further comprising a firewall module operable to use two or more firewall rules to provide firewall filtering of network traffic.

17. The method of operating a computer network device of claim 16, wherein the intrusion prevention rules are associated with specific firewall rules, such that only relevant intrusion prevention rules are applied to specific network traffic identified via the firewall.

18. The method of operating a computer network device of claim 11, further comprising a packet processing module operable to receive network packets and reconstruct a data stream from the data encoded in the received network packets.

19. A method of operating a computer network device, comprising:
providing an intrusion prevention rule set comprising a plurality of rules, each of the plurality of rules associated with at least one classification parameter, wherein the classification parameter comprises a rule type of the associated rule; and
using the classification parameters associated with the plurality of intrusion prevention rules to provide network intrusion protection of network traffic wherein the classification parameters indicate a subset of the plurality of intrusion prevention rules to apply,
wherein the classification parameters are determined from information provided by a firewall based on analysis, by the firewall, of a corresponding data stream, and
wherein the information provided by the firewall is obtained by the firewall while processing the corresponding data stream prior to providing network intrusion protection.

20. The method of operating a computer network device of claim 19, wherein each of the plurality of rules of the intrusion prevention rule set is further associated with a response type that is applied in the event of a rule violation.

\* \* \* \* \*

UNITED STATES PATENT AND TRADEMARK OFFICE
CERTIFICATE OF CORRECTION

| | | |
|---|---|---|
| PATENT NO. | : 8,561,129 B2 | Page 1 of 1 |
| APPLICATION NO. | : 12/039490 | |
| DATED | : October 15, 2013 | |
| INVENTOR(S) | : David Diehl et al. | |

It is certified that error appears in the above-identified patent and that said Letters Patent is hereby corrected as shown below:

On the Title Page, item (56), in column 2, under "Other Publications", line 8, delete "Preventi_on" and insert -- Prevention --, therefor.

In the Claims
In column 8, line 38, in claim 9, delete "parameters" and insert -- parameters, --, therefor.

Signed and Sealed this
Fourth Day of February, 2014

Michelle K. Lee
*Deputy Director of the United States Patent and Trademark Office*